Patented Dec. 13, 1927.

1,652,218

UNITED STATES PATENT OFFICE.

ALLEN P. TALLMAN, OF TOLEDO, OHIO.

RUBBER MOLD AND METHOD OF TREATING THE MOLDING SURFACES.

No Drawing.   Application filed April 13, 1923.   Serial No. 631,879.

This invention is concerned with the manufacture of molded rubber articles and has for its general object the provision of a rubber mold and a method of treating the molding surfaces thereof, whereby the sticking or adhering of the cured rubber articles to the molding surfaces of the mold may be prevented.

More specifically, my invention is directed to the provision of a rubber mold, such as a tire mold, having a specially treated molding surface which will withstand molding pressures and temperatures, the surfacing being in the nature of a baked japan, which may retain lubricating characteristics added thereto in the form of metallic stearates before being applied to the mold and baked thereon, and which may be readily removed from the mold walls when it is necessary after protracted use to resurface the mold walls.

A further object of my invention is the provision of a method for coating the molding surfaces of rubber molds whereby rubber articles, molded and cured therein, may have a highly glossed surface which will reflect the true color of the rubber compounds of which the molded article is formed. Other objects of my invention will be hereinafter set forth in the following specification, which discloses the manner whereby I fulfill the foregoing objects.

My invention contemplates the treating of the molding surfaces of metallic molds with a japan having special characteristics, among which are that it may withstand a high temperature, that is, a temperature above a rubber curing temperature; that it may have a smooth, hard surface which is not sticky; that it may have, even after it has been baked to obtain the proper degree of hardness thereof, lubricating characteristics which will prevent the adhering of the cured article to the japanned surfaces during and after the molding and curing operations; and finally that it may have the additional characteristics of metal adherence and fluxine consistency to fill minute pores in the metal surface.

Such a japan coating may be prepared by cooking a drying oil or combination of drying oils, with so called metallic dryers, such as lead, iron, manganese, or cobalt salts, which are soluble in the drying oil under approximately boiling temperatures. The function of such salts is in the nature of an oxidizing reaction when the japan is baked after having been applied to the mold surfaces. A suitable varnish gum, which may be any gum having a vegetable or asphalt origin, may then be added to the metallic oil solution. Gilsonite, elaterite, or a petroleum pitch will be found to be a suitable gum. I find, however, that a gum, commonly known in the art as fossil gum, may be used with convenience. Proper agitation of this mixture, while the oil is still at a temperature above normal, will result in a homogeneous mixture, in that the gum will completely dissolve. The consistency of this mixture may be then reduced to a lower density by the introduction of a suitable solvent, such as turpentine or a petroleum distillate. This mixture may then be used as a flotation means in grinding a pigment or pigments to a sufficient fineness to remain in homogeneous suspension in the resulting varnish. A sufficient solvent may be added whereby the mixture, when at ordinary temperatures, may be sprayed through an atomizer.

I find that the following specific ingredients and proportions thereof will compound a varnish having the desired characteristics:

When 23% by weight of ferric oxide, 2% lamp black, 8% china wood oil, 10% linseed oil and 6% lead manganese linoleate are mixed and ground in the usual grinding processes of varnish making, a mixture will be obtained which, when 15% copal gum is added, will give a thick varnish which may be readily mixed. The specific gravity or density of this mixture may be lowered by adding 41⅖% petroleum distillate giving a varnish which may be readily sprayed through an ordinary atomizer.

Such a mixture may be sprayed upon the mold surfaces after said surfaces have been thoroughly treated or cleaned with a suitable deterent, whereby all foreign matter, such as grease, is removed therefrom. In thinning such a solution, the conditions under which the mixture is to be applied to the mold should be considered. If it is desired to apply the mixture to the mold surfaces with a brush, the mixture may be thicker than when applied with an atomizer. When applying with an atomizer, however, the mixture should not be thinned to such a degree that it would run after being applied to the mold surfaces.

After the mold surfaces or cavities have been thoroughly coated with this mixture, the mold may be subjected to a preliminary baking temperature, which may be raised gradually during a period of one half hour up to substantially 400 degrees F. The mold coating, during this period, will give up any volatile matter and it may then be withdrawn from the heat influence and the surface thereof given a rubbing treatment, after which it may be again placed under a heat influence and a further baking period of an hour and a half at substantially 450 degrees will thoroughly harden the coating. Such a coating will be quite serviceable in preventing the adherence of the molded article to the mold wall, after the curing thereof.

The components of such a japan are selected with the idea of obtaining an extraordinarily smooth, hard surface after the japan has been baked. Such enamel may comprise a drying oil or drying oils with metallic dryers, such as may be used in the first coating hereinbefore described, namely, lead, iron, manganese or cobalt and a suitable varnish gum, in this case, preferably, gum of asphalt origin. The mixture, when heated and agitated in the customary manner, may then receive a lubricating medium which may be introduced into the solution in the form of a metallic soap or soaps, such as a calcium, an aluminum or a magnesium stearate. Proper agitation of the solution will cause the stearate to be completely dissolved therein, after which the mixture may be cooled and properly thinned with a suitable reducer, such as turpentine or petroleum distillate.

I find that the following preferred ingredients and proportions thereof give very satisfactory results:

Asphaltum gum, 21% by weight.
Linseed oil, 17% by weight.
Combination lead, manganese and cobalt linoleates, 1½% by weight.
Then add:
Aluminum stearate, 8½% by weight.
Petroleum distillate or turpentine 52%.

As in the first instance, this mixture may be sprayed upon the mold surfaces with an atomizer or may be applied with a brush, as described. This coating, when applied over the previously baked coating, may then be baked during a preliminary period of approximately one half of an hour at a temperature of about 350 degrees Fahrenheit. The baking period may then be continued through a period of two hours at a gradually rising temperature, approximating substantially 400 or 450 degrees. The resulting surface on the mold will have an extremely high gloss while the stearates, which were introduced into the japan before being applied to the mold, will serve as a lubricating medium, thus preventing the rubber from adhering to the cavity surfaces during the molding and curing operations.

If it is desired to obtain a more perfect molding surface in the mold cavity, whereby a highly glossed surface may be imparted to the cured articles, the mold may be subjected to a second coating treatment which may comprise a baking japan, having lubricating ingredients therein which will not be deprived of their lubricating qualities under a japan baking temperature which is highter than a rubber curing temperature.

A rubber mold, having the molding surfaces thereof treated in the manner as herein set forth, will be found to have extraordinary advantages over the usual mold which has the surfaces thereof treated with soap stone, soap bark, or other lubricating materials which are introduced into the molds at each curing operation, in that no rubber particles adhere to the mold surfaces and the mold may consequently remain in production during a considerably greater period than an untreated mold. The product formed by such a mold has the surfaces thereof highly glossed and these glossy surfaces reflect the true color of the rubber compound due to the fact that no foreign lubricating matter is introduced into the molds. Furthermore, a mold treated in the manner described will release the cured article when the mold is parted, thus eliminating the necessity for using force in removing the cured article from the mold. This characteristic will be found to be extremely advantageous in the molding and curing of light rubber articles, such as water bottles, gloves and drug sundries, as there has always been a considerable loss in molded articles being destroyed when the articles adhere to the mold after the curing operation. Furthermore, when it is subsequently necessary to clean the molds, it is possible to remove the coating from the mold wall by an electrolytic process which accomplishes the desired results in considerably less time than has heretofore been found feasible in cleaning ordinary unsurfaced molds by the usual burning and scraping processes.

What I claim is:—

1. A rubber mold having the rubber article defining surfaces thereof coated with a baked japan having a rubber lubricating material incorporated therein.

2. A rubber mold having the rubber article defining surfaces thereof surfaced with a japan having a rubber lubricating material incorporated therein.

3. A rubber mold which has the mold defining surfaces thereof coated with a baked substance which includes a metallic stearate.

4. The process of the character described which includes the steps of preparing a mixture of a drying oil, a varnish gum soluble therein, oxidizing agents, introduced as resinates or linoleates, and pigments, subjecting the mixture to a grinding or pulverizing operation whereby a homogeneous suspension of the various constituents thereof may be obtained, thinning said mixture with an agent which is a solvent for all of the elements in the mixture, applying said mixture to the mold defining surfaces of a metallic rubber mold, subjecting said mold to a japan baking temperature, of approximately 350 degrees for a preliminary baking period of substantially one half hour, increasing said temperature during a protracted, subsequent baking period of one and one half hours, removing the mold from the heat influence, recoating said treated surfaces with a baking japan including a metallic stearate, and rebaking the mold.

5. The process of treating a metallic rubber mold which includes the steps of preparing a mixture comprising a baking japan including a metallic stearate, applying said mixture to the cavity surfaces of a metallic rubber mold, and subjecting said mold to a japan baking temperature, when the surfaces thereof are so treated.

6. The process of treating a rubber mold to obtain glossed surfaces which includes the steps of mixing a varnish having a baking temperature higher than the curing temperature of rubber, applying the mixture to the rubber defining surfaces of the mold, subjecting said mold to a baking temperature to cause the volatile matter to be driven out of the varnish and to vitrify the solids, removing the mold from the baking influence, applying a second coating of varnish which includes ingredients which will lubricate rubber when in the mold cavity after said second coating has been placed thereon.

7. The process of treating a rubber mold which includes the steps of coating the rubber defining surfaces of the mold with a japan having a baking temperature greater than curing temperature of rubber, applying a second coating of japan, having similar baking characteristics, and containing a mold lubricating medium which will withstand the baking temperatures of the japan and function to prevent adhering of the rubber to said japanned surfaces when the mold is subsequently used for molding and curing rubber articles.

In testimony whereof, I hereunto affix my signature.

ALLEN P. TALLMAN.